United States Patent
Kameya (10) Patent No.: US 8,111,298 B2
(45) Date of Patent: Feb. 7, 2012

(54) IMAGING CIRCUIT AND IMAGE PICKUP DEVICE

(75) Inventor: Takashi Kameya, Kanagawa (JP)

(73) Assignee: Sony Corporation, Tokyo (JP)

( * ) Notice: Subject to any disclaimer, the term of this patent is extended or adjusted under 35 U.S.C. 154(b) by 659 days.

(21) Appl. No.: 12/131,542

(22) Filed: Jun. 2, 2008

(65) Prior Publication Data

US 2009/0021597 A1 Jan. 22, 2009

(30) Foreign Application Priority Data

Jul. 20, 2007 (JP) ................ 2007-189033

(51) Int. Cl.
*H04N 5/228* (2006.01)
*H04N 3/14* (2006.01)

(52) U.S. Cl. .................. 348/222.1; 348/272

(58) Field of Classification Search .......... None
See application file for complete search history.

(56) References Cited

U.S. PATENT DOCUMENTS 6,522,356 B1 * 2/2003 Watanabe .............. 348/272
7,626,154 B2 * 12/2009 Sei et al. .............. 250/208.1
2006/0139469 A1 * 6/2006 Yokota et al. ........... 348/272
2007/0146511 A1 * 6/2007 Kinoshita et al. ........ 348/272

FOREIGN PATENT DOCUMENTS

JP 2006-211631 8/2006

* cited by examiner

*Primary Examiner* — Luong T Nguyen
(74) *Attorney, Agent, or Firm* — Oblon, Spivak, McClelland, Maier & Neustadt, L.L.P.

(57) ABSTRACT

An imaging circuit includes a photoelectric conversion section and a transferring section. The photoelectric conversion section in which pixels each having a color filter attached thereto are arranged in an oblique direction in a lattice manner. The color filter is formed of: a GR line on which G and R pixels are alternately arranged in a horizontal direction; a GB line on which the G and B pixels are alternately arranged in a horizontal direction; and a G line on which only the G pixel is arranged in a horizontal direction, and having a combination of: the GR and G lines; and the GB and G lines being placed alternately in a vertical direction to arrange the G pixel at a position adjacent to the R and B pixels. The transferring section for transferring only an electrical signal associated with pixels included on the GR line and the GB line.

9 Claims, 6 Drawing Sheets

TIMING CHART OF ALL PIXEL MODE

FIG. 6B

TIMING CHART OF BAYER MODE

FIG. 7

IMAGING CIRCUIT AND IMAGE PICKUP DEVICE

CROSS-REFERENCE TO RELATED APPLICATIONS

The present application claims benefit of priority of Japanese patent Application No. 2007-189033 filed in the Japanese Patent Office on Jul. 20, 2007, the entire disclosure of which is incorporated herein by reference.

BACKGROUND OF THE INVENTION

1. Field of the Invention

The present invention relates to an imaging circuit, and more particularly, relates to an imaging circuit and an image pickup device using a color filter having an oblique arrangement of pixels.

2. Description of Related Art

Recently, image pickup devices such as a digital video camera, a digital still camera, etc., in which a subject is imaged and recorded into a recording medium, are widely used. These image pickup devices are increasingly miniaturized and improved in image quality. A solid-state image pickup element (imaging device) is mounted on the image pickup devices, and a color filter is attached to a light-receiving surface of the solid-state image pickup element. An intensity of light is inputted into the solid-state image pickup element through the color filter, and an electrical signal corresponding to the intensity of light is outputted, as RAW data, from the solid-state image pickup element.

For example, for the color filter used for the solid-state image pickup element, a color filter having a Bayer arrangement in which a ratio of G (Green):R (Red):B (Blue) is 2:1:1 is widely known. To meet a requirement of the high quality image of the image pickup device, color filters having various pixel arrangements other than the Bayer arrangement are proposed.

For example, instead of the Bayer arrangement in which the ratio of G (green):R (red):B (blue) is 2:1:1, there is proposed a color filter having a pixel arrangement in which the ratio of G (green):R (red):B (blue) is 6:1:1 and further, the pixel arrangement is rotated by 45 degrees (a color filter having a so-called oblique pixel arrangement) (see Japanese Unexamined Application Publication No. 2006-211631, hereinafter, referred to as "Patent Document 1", (FIG. 7), for example).

SUMMARY OF THE INVENTION

According to the earlier developing technology described above, a high sensibility may be achieved, and a high speed and a higher-pixel-density moving image also may also be achieved, as compared to the color filter having the known Bayer arrangement.

Herein, consider an image pickup device for providing a plurality of photographing modes, for example. In such an image pickup device, resolutions and frame rates corresponding to the individual photographing modes differ, respectively.

For example, in a monitoring mode in which a subject is monitored during photographing, the resolution may be low while for the frame rate, an intermediate frame rate may be required. Further, in a moving image photographing mode in which a moving image is photographed, an intermediate resolution is required for the resolution and the intermediate frame rate is required for the frame rate. In a still image photographing mode in which a still image is photographed, the frame rate may be low while a high resolution is required for the resolution. In a high-speed imaging mode in which the moving image is photographed at high speed, the resolution may be low while a high frame rate is required for the frame rate.

As described above, since the resolution and frame rate required for each photographing mode differ, when the photographing is performed in each photographing mode, it would be desirable that the resolution and frame rate are set to the most appropriate ones corresponding to the photographing mode in which the photographing is performed. For example, in a case where the color filter having a Bayer arrangement is used for the solid-state image pickup element, when changing the resolution and the frame rate, a method in which thinning-out and addition are performed in the solid-state image pickup element to set the resolution, etc., is generally widely used. For example, when a high resolution is required, a reading-out interval may be widened to lower the frame rate, thereby achieving a constant resolution. When the frame rate is increased, the thinning-out or the pixel addition may be performed to lessen the number of pixels, thereby achieving a constant frame rate.

With respect also to the color filter having the earlier developing oblique arrangement of pixels, since the arrangement of the color filter follows a repetition pattern, similar to a case of the color filter having the Bayer arrangement, it may change the resolution and the frame rate by the pixel addition or the pixel thinning-out.

However, with respect to the color filter having the oblique arrangement of pixels, when the pixel addition similar to that of the color filter having the Bayer arrangement is provided, the addition is performed so that wider pixel intervals of each color are preferentially averaged. Consequently, this case may, similar to the solid-state image pickup element having a high aperture ratio, lead to a blurred image in which high frequency information is entirely dropped.

With respect to the color filter having the oblique arrangement of pixels, when the pixel thinning-out that is similar to that of the color filter having the Bayer arrangement is provided, widening of the pixel intervals of each color results in a rough sampling. Thus, a high frequency component causes aliasing, and thus, an image quality may be deteriorated.

Accordingly, it would be desirable that in the still image photographing mode, etc., in which the high resolution, the low frame rate, etc., are required, the high sensibility, the high speed, the high-pixel-density moving image, etc., provided by the color filter having the earlier developing pixel arrangement of pixels are kept while in the monitoring, etc., in which the low resolution and the intermediate frame rate, etc., are required, the image quality is kept and the appropriate resolution and frame rate, etc., are set.

Accordingly, it is desirable to acquire an appropriate image corresponding to a photographing mode in an image pickup element using a color filter having an oblique arrangement of pixels.

In accordance with a first aspect of the present invention, there is provided an imaging circuit including: a photoelectric conversion section in which pixels each having a color filter attached thereto are arranged in an oblique direction in a lattice manner and which converts light incident through the color filter into an electrical signal by each of the pixels and outputs the electrical signal, and a transferring section. The color filter is formed of: a GR line on which a G pixel and an R pixel are alternately arranged in a horizontal direction; a GB line on which the G pixel and a B pixel are alternately arranged in a horizontal direction; and a G line on which only the G pixel is arranged in a horizontal direction, and having a combination of: the GR line and the G line; and the GB line and the G line being placed alternately in a vertical direction to place the G pixel at a position adjacent to the R pixel and the B pixel. The transferring section transfers, out of electrical signal converted by the photoelectric conversion section, only an electrical signal associated with pixels included on the GR line and the GB line. Thus, only the electrical signal associated with the pixels included on the GR line and the GB line is transferred.

The transferring section may select either one of a first transfer mode or a second transfer mode. The first transfer mode transfers, out of the electrical signal converted by the photoelectric conversion section on the basis of a control signal from outside, the electrical signal associated with each of the lines is sequentially transferred. The second transfer mode transfers, out of the electrical signal converted by the photoelectric conversion section, only the electrical signal associated with the pixels included on the GR line and the GB line is transferred, to transfer the electrical signal converted by the photoelectric conversion section. Thus, on the basis of a control signal from outside, either one of the first transfer mode in which, out of the electrical signal converted by the photoelectric conversion section, the electrical signal associated with each of the lines is sequentially transferred; or the second transfer mode in which, out of the electrical signal converted by the photoelectric conversion section, only the electrical signal associated with the pixels included on the GR line and the GB line is transferred is selected to transfer the electrical signal converted by the photoelectric conversion section.

The color filter in which the G line is thinned-out may be arranged in such a manner that a combination pattern of: the G pixel and the R pixel included on the GR line adjacent to a surrounding area of one G pixel included on the G line; and the G pixel and B pixel included on the GB line is arranged in a lattice manner. Thus, a light incident through the color filter arranged so that a combination pattern of: the G pixel and the R pixel included on the GR line adjacent to a surrounding area of one G pixel included on the G line; and the G pixel and B pixel included on the GB line is arranged in a lattice manner is transferred by converting into an electrical signal by each pixel.

In accordance with a second aspect of the present invention, there is provided an image pickup device including a photoelectric conversion section in which pixels each having a color filter attached thereto are arranged in an oblique direction in a lattice manner and which converts light incident through the color filter into an electrical signal by each of the pixels and outputs the electrical signal, a transferring section, a first demosaic processing section, and a second demosaic section. The color filter is formed of: a GR line on which a G pixel and an R pixel are alternately arranged in a horizontal direction; a GB line on which the G pixel and a B pixel are alternately arranged in a horizontal direction; and a G line on which only the G pixel is arranged in a horizontal direction, and having a combination of: the GR line and the G line; and the GB line and the G line being placed alternately in a vertical direction to place the G pixel at a position adjacent to the R pixel and the B pixel. The transferring section selects either one of a first transfer mode or a second transfer mode to transfer the electrical signal converted by the photoelectric conversion section. The first transfer mode transfers, out of the electrical signal converted by the photoelectric conversion section, the electrical signal associated with each of the lines is sequentially transferred. The second transfer mode transfers, out of the electrical signal converted by the photoelectric conversion section, only the electrical signal associated with the pixels included on the GR line and the GB line is transferred. The first demosaic processing section performs a demosaic process on the electrical signal associated with each of the lines, the electrical signal being transferred in the first transfer mode. The second demosaic processing section performs a demosaic process on the electrical signal associated with the GR line and the GB line, the electrical signal being transferred in the second transfer mode. Thus, either one of: the first transfer mode in which out of the electrical signal converted by the photoelectric conversion section, the electrical signal associated with each of the lines is sequentially transferred; or the second transfer mode in which out of the electrical signal converted by the photoelectric conversion section, only the electrical signal associated with the pixels included on the GR line and the GB line is transferred is selected thereby to transfer the electrical signal converted by the photoelectric conversion section. The demosaic process is performed by the first demosaic processing section on the electrical signal associated with each of the lines, the electrical signal being transferred in the first transfer mode; and the demosaic process is performed by the second demosaic processing section on the electrical signal associated with the GR line and the GB line, the electrical signal being transferred in the second transfer mode.

The image pickup device may further include: an operation receiving section for receiving an operation input to set at least either one of a first photographing mode or a second photographing mode; and a controlling section. The controlling section, in receipt of the operation input to set the first photographing mode, selects the first transfer mode to cause the electrical signal converted by the photoelectric conversion section to be transferred to the transferring section and to cause the first demosaic processing section to perform the demosaic process on the transferred electrical signal, and, in receipt of the operation input to set the second photographing mode, selects the second transfer mode to cause the electrical signal converted by the photoelectric conversion section to be transferred to the transferring section and to cause the second demosaic processing section to perform the demosaic process on the transferred electrical signal. Thus, in receipt of the operation input to set the first photographing mode, the first transfer mode is selected to cause the electrical signal converted by the photoelectric conversion section to be transferred and to cause the first demosaic processing section to perform the demosaic process on the transferred electrical signal, and on the other hand, in receipt of the operation input to set the second photographing mode, the second transfer mode is selected to cause the electrical signal converted by the photoelectric conversion section to be transferred and to cause the second demosaic processing section to perform the demosaic process on the transferred electrical signal.

The color filter of the image pickup device may have an oblique pixel arrangement. The first demosaic processing section may perform the demosaic process on an electrical signal corresponding to the color filter having the oblique pixel arrangement. The second demosaic processing section may perform the demosaic process on an electrical signal corresponding to the color filter having a Bayer arrangement. Thus, the first demosaic processing section performs the demosaic process on the electrical signal corresponding to the color filter having the oblique pixel arrangement, and the second demosaic processing section performs the demosaic process on the electrical signal corresponding to the color filter having the Bayer arrangement.

The above summary of the present invention is not intended to describe each illustrated embodiment or every implementation of the present invention. The figures and the detailed description which follow more particularly exemplify these embodiments.

DETAILED DESCRIPTION OF EMBODIMENTS

Subsequently, with reference to the drawings, an embodiment of the present invention is described in detail.

Figure 1:
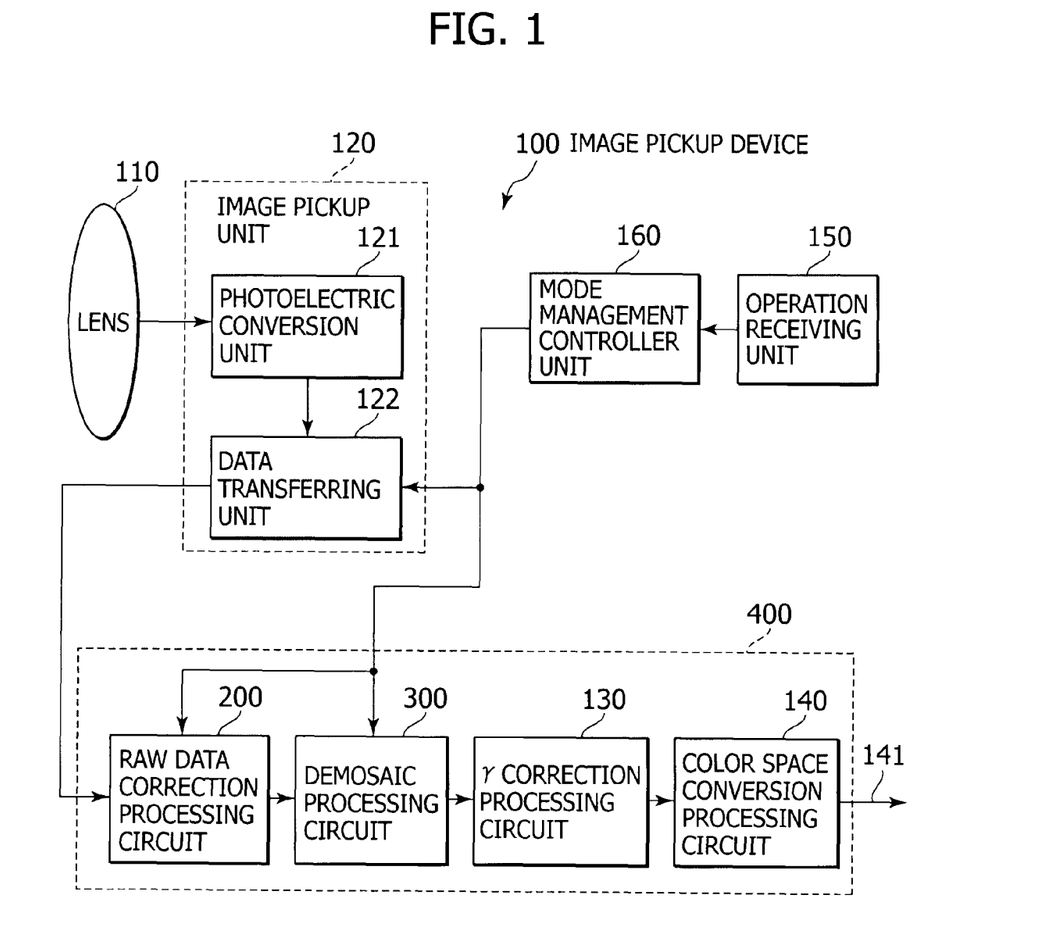
FIG. 1 is a block diagram showing one configuration example of an image pickup device 100.

FIG. 1 is a block diagram showing an image pickup device 100 according to an embodiment of the present invention. The image pickup device 100 includes: a lens 110; an image pickup unit 120; an operation receiving unit 150; a mode management controller unit 160; and an image processing unit 400. The image pickup device 100 is that, such as a camcorder capable of photographing a still image, a digital still camera capable of photographing a moving image, etc., which is capable of photographing moving and still images. The image pickup device 100 provides a plurality of different photographing modes such as a moving image photographing mode, a still image photographing mode, a high-speed imaging mode, a monitoring mode, etc., for example.

In an embodiment, an imaging circuit corresponds to the image pickup unit 120, for example. In another embodiment, an image pickup device corresponds to the image pickup device 100, for example.

Figure 7:
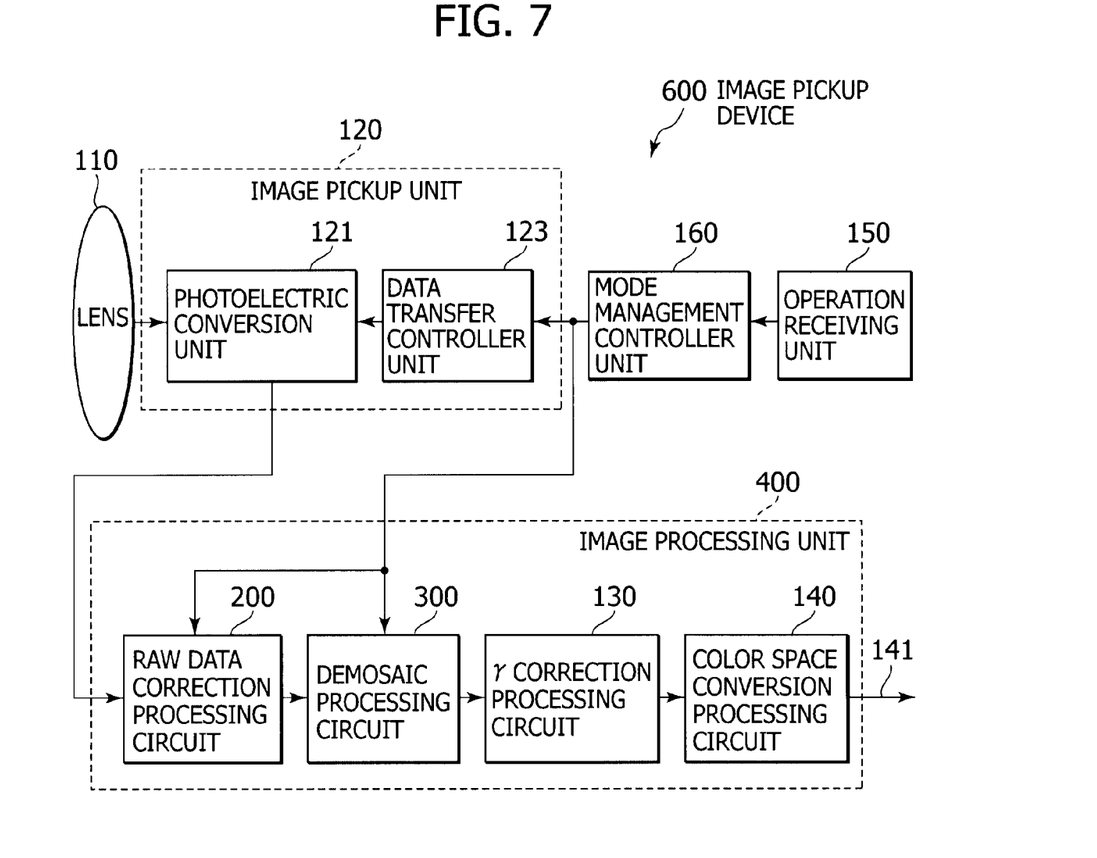
FIG. 7 is a block diagram showing one configuration example of an image pickup device 600 obtained by modifying a part of the image pickup device 100.

In an embodiment, a photoelectric conversion section corresponds to the photoelectric conversion unit 121, for example. A transferring section corresponds to the data transferring unit 122 or the data transfer controller unit 123, for example.

In an embodiment, an operation receiving section corresponds to the operation receiving unit 150, for example. A controlling section corresponds to the mode management controller unit 160, for example.

The lens 110 is a lens for collecting an incident light from a light source and a reflected light from a subject to be imaged.

The image pickup unit 120 converts a light signal which passes through the lens 110 into an electrical signal and outputs the converted electrical signal, as RAW data, to the image processing unit 400. The image pickup unit 120 includes a photoelectric conversion unit 121 and a data transferring unit 122. The photoelectric conversion unit 121 is composed of a solid-state image pickup element (image sensor) such as a CCD (Charge Coupled Device), a CMOS (Complementary Metal-Oxide Semiconductor), etc., and applies a photoelectric conversion process to the light signal which passes through the lens 110. The photoelectrically converted electrical signal is transferred to a RAW data correction processing circuit 200 by the data transferring unit 122. Each pixel constituting a light receiving unit of the photoelectric conversion unit 121 is arranged in an oblique direction in a lattice manner, and each pixel is attached with a color filter. That is, the light receiving unit of the photoelectric conversion unit 121 is attached with the color filter having a so-called oblique pixel arrangement. The color filter having the oblique pixel arrangement and the RAW data outputted by the image pickup unit 120 are described in detail with reference to FIG. 4 to FIG. 6.

Herein, a plurality of photographing modes, such as a moving image photographing mode, a still image photographing mode, a high-speed imaging mode, a monitoring mode, etc., provided by the image pickup device 100 may be divided roughly into an all-pixel mode and a Bayer mode. In the all-pixel mode, the RAW data in an oblique pixel arrangement format is outputted from the image pickup unit 120. In the Bayer mode, the RAW data of a Bayer format is outputted from the image pickup unit 120. The all-pixel mode used herein is a photographing mode in which all pixels that can be outputted from the photoelectric conversion unit 121 are outputted. The all-pixel mode is appropriate for a still image photographing, etc., requiring a high resolution. The RAW data in an oblique pixel arrangement format means RAW data outputted by using a color filter having an oblique pixel arrangement shown in FIG. 4. On the other hand, the Bayer mode is a photographing mode in which a part of the pixels that can be outputted from the photoelectric conversion unit 121 is outputted. The Bayer mode is appropriate for a monitoring, etc., not requiring the high resolution. The RAW data of a Bayer format means RAW data outputted by using a color filter having an oblique pixel arrangement shown in FIG. 5.

The data transferring unit 122 reads out the electrical signal by each line from each pixel constituting the photoelectric conversion unit 121 in accordance with a control signal outputted from the mode management controller unit 160, and transfers the read electrical signal, as the RAW data, to the RAW data correction processing circuit 200. That is, when the control signal corresponding to the all-pixel mode is inputted, the data transferring unit 122 sequentially reads out the electrical signal from each line constituting the photoelectric conversion unit 121 and transfers the read electrical signal, as the RAW data in an oblique pixel arrangement format, to the RAW data correction processing circuit 200. On the other hand, when the control signal corresponding to the Bayer mode is inputted, the data transferring unit 122 sequentially reads out the electrical signal from lines other than a G line arranged with only G pixel out of each line constituting the photoelectric conversion unit 121, and transfers the read electrical signal, as the RAW data in a Bayer format, to the RAW data correction processing circuit 200.

The image processing unit 400 performs a signal processing to the RAW data outputted from the image pickup unit 120, generates a YCbCr video signal, and outputs the generated YCbCr video signal to a signal line 141. The image processing unit 400 includes: the RAW data correction processing circuit 200; a demosaic processing circuit 300; a γ correction processing circuit 130; and a color space conversion processing circuit 140.

The RAW data correction processing circuit 200 performs a signal processing by each color to the RAW data outputted from the image pickup unit 120 and outputs the signal-processed RAW data to the demosaic processing circuit 300. The RAW data correction processing circuit 200 is described in detail with reference to FIG. 2.

The demosaic processing circuit 300 generates RGB data from the RAW data outputted from the RAW data correction processing circuit 200 and outputs the generated RGB data to the γ correction processing circuit 130. The demosaic processing circuit 300 is described in detail with reference to FIG. 3.

The γ correction processing circuit 130 performs a compression processing (luminance compression processing) to a gradation of each color with respect to the RGB data outputted from the demosaic processing circuit 300, and outputs the compression-processed RGB data to the color space conversion processing circuit 140.

The color space conversion processing circuit 140 generates a luminance signal Y, a color difference signal (blue) Cb, and a color difference signal [0] (red) Cr from the RGB data outputted from the γ correction processing circuit 130, and outputs the generated YCbCr video signal to the signal line 141.

The operation receiving unit 150 includes a photographing mode setting button, etc., for setting the photographing mode of the image pickup device 100, and, in response to receive an operation input from the mode setting button, outputs a content of the received operation input to the mode management controller unit 160. For example, there are photographing mode setting buttons for setting the monitoring, the moving image photographing mode, the still image photographing mode, and the high-speed imaging mode.

When the content of the operation input is inputted from the operation receiving unit 150, the mode management controller unit 160 outputs the control signal corresponding to the content of the operation input to the data transferring unit 122, the RAW data correction processing circuit 200, and the demosaic processing circuit 300. For example, when the content of the operation input from the operation receiving unit 150 is to set the moving image photographing mode, the still image photographing mode, etc., a control signal to set the all-pixel mode is outputted to each unit. On the other hand, when the content of the operation input from the operation receiving unit 150 is to set the monitoring, the high-speed imaging mode, etc., a control signal to set the Bayer mode is outputted to each unit.

Figure 2:
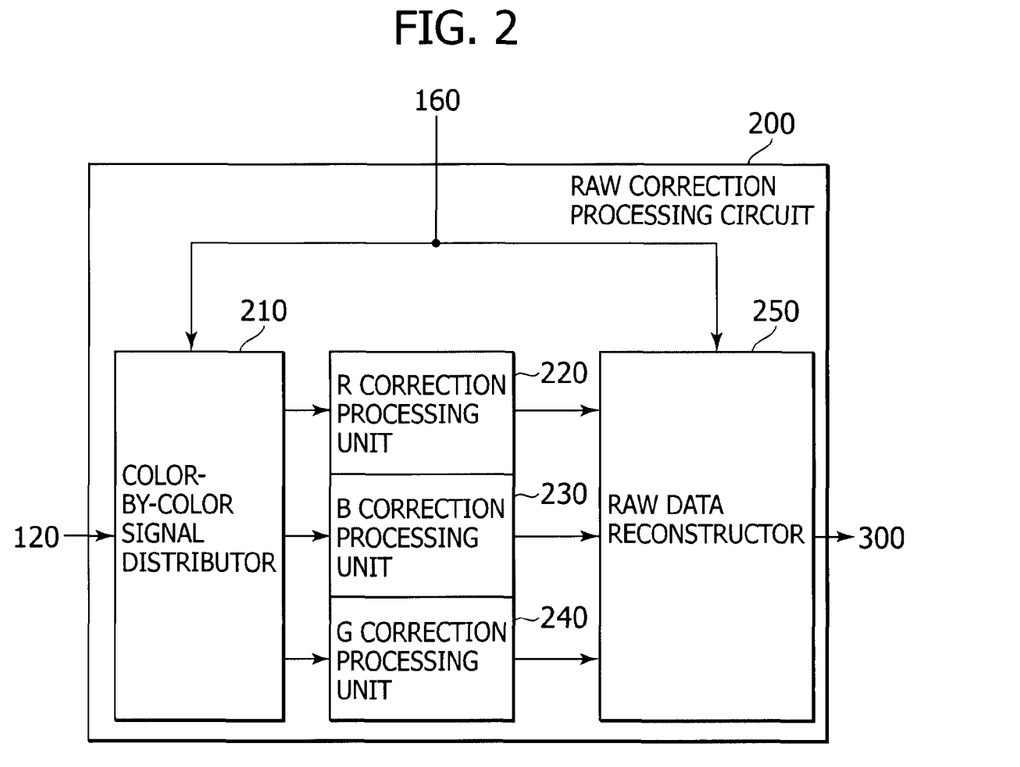
FIG. 2 is a block diagram showing one configuration example of a RAW data correction processing circuit 200.

FIG. 2 is a block diagram showing one configuration example of the RAW data correction processing circuit 200 in an embodiment of the present invention. The RAW data correction processing circuit 200 includes: a color-by-color signal distributor 210; an R correction processing unit 220; a B correction processing unit 230; a G correction processing unit 240; and a RAW data reconstructor 250. Herein, the control signal outputted from the mode management controller unit 160 is inputted to the color-by-color signal distributor 210 and the RAW data reconstructor 250.

The color-by-color signal distributor 210 distributes the RAW data outputted from the image pickup unit 120 into each color component, i.e., red, green, and blue, based on the control signal outputted from the mode management controller unit 160, and outputs each color component to any one of the R correction processing unit 220, the B correction processing unit 230, and the G correction processing unit 240. That is, when the control signal corresponding to the all-pixel mode is inputted from the mode management controller unit 160 to the color-by-color signal distributor 210, the RAW data inputted from the image pickup unit 120 to the color-by-color signal distributor 210 is the RAW data in an oblique pixel arrangement format. As a result, the RAW data in an oblique pixel arrangement format is distributed into each color component. On the other hand, when the control signal corresponding to the Bayer mode is inputted from the mode management controller unit 160 to the color-by-color signal distributor 210, since the RAW data inputted from the image pickup unit 120 to the color-by-color signal distributor 210 is the RAW data of a Bayer format, the RAW data of a Bayer format is distributed into each color component. As a result, an R-color component of the distributed signal is outputted to the R correction processing unit 220, a B-color component of the distributed signal is outputted to the B correction processing unit 230, and a G-color component of the distributed signal is outputted to the G correction processing unit 240.

The R correction processing unit 220, the B correction processing unit 230, and the G correction processing unit 240 perform a RAW correction signal processing to the RAW data of each color outputted from the color-by-color signal distributor 210, and output the applied RAW data to the RAW data reconstructor 250.

The RAW data reconstructor 250 reconstructs the RAW data divided into the RGB data according to the control signal outputted from the mode management controller unit 160, and outputs the reconstructed RAW data to the demosaic processing circuit 300. That is, when the R-color component outputted from the R correction processing unit 220, the B-color component outputted from the B correction processing unit 230, and the G-color component outputted from the G correction processing unit 240 are inputted to the RAW data reconstructor 250, the RAW data distributor 250 reconstructs the inputted each color component as the RAW data. In this case, when the control signal corresponding to the all-pixel mode is inputted from the mode management controller unit 160 to the RAW data reconstructor 250, each color component is reconstructed as the RAW data in an oblique pixel arrangement format. On the other hand, when the control signal corresponding to the Bayer mode is inputted from the mode management controller unit 160 to the RAW data reconstructor 250, each color component is reconstructed as the RAW data of a Bayer format.

Figure 3:
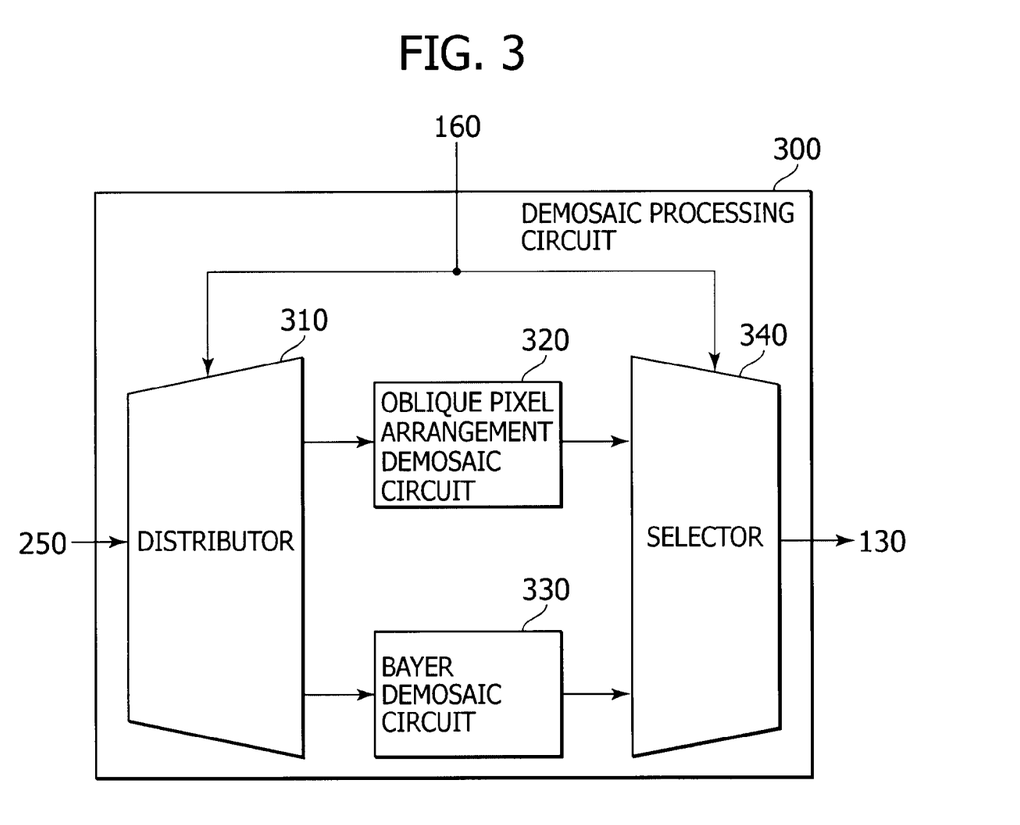
FIG. 3 is a block diagram showing one configuration example of a demosaic processing circuit 300.

FIG. 3 is a block diagram showing one configuration example of the demosaic processing circuit 300 in an embodiment of the present invention. The demosaic processing circuit 300 includes: a distributor 310; an oblique pixel arrangement demosaic circuit 320; a Bayer demosaic circuit 330; and a selector 340. Herein, the control signal outputted from the mode management controller unit 160 is inputted to the distributor 310 and the selector 340.

In an embodiment, a first demosaic processing section corresponds to the oblique pixel arrangement demosaic circuit 320, for example. A second demosaic processing section corresponds to the Bayer demosaic circuit 330, for example.

The distributor 310 outputs the RAW data outputted from the RAW data reconstructor 250 shown in FIG. 2, according to the control signal outputted from the mode management controller unit 160, to either one of the oblique pixel arrangement demosaic circuit 320 or the Bayer demosaic circuit 330. That is, when the distributor 310 is inputted the control signal corresponding to the all-pixel mode from the mode management controller unit 160, the distributor 310 outputs to the oblique pixel arrangement demosaic circuit 320 the RAW data outputted from the RAW data reconstructor 250. On the other hand, when the distributor 310 is inputted the control signal corresponding to the Bayer mode from the mode management controller unit 160, the distributor 310 outputs to the Bayer demosaic circuit 330 the RAW data outputted from RAW data reconstructor 250.

The oblique pixel arrangement demosaic circuit 320 performs a demosaic processing to the RAW data in an oblique pixel arrangement format, of which the RAW data is outputted from the distributor 310, and outputs the RGB data to the selector 340. That is, the RAW data outputted from the image pickup unit 120 through the color filter having the oblique pixel arrangement shown in FIG. 4 is subjected to the demosaic processing such as a complementing process, etc.

Figure 5:
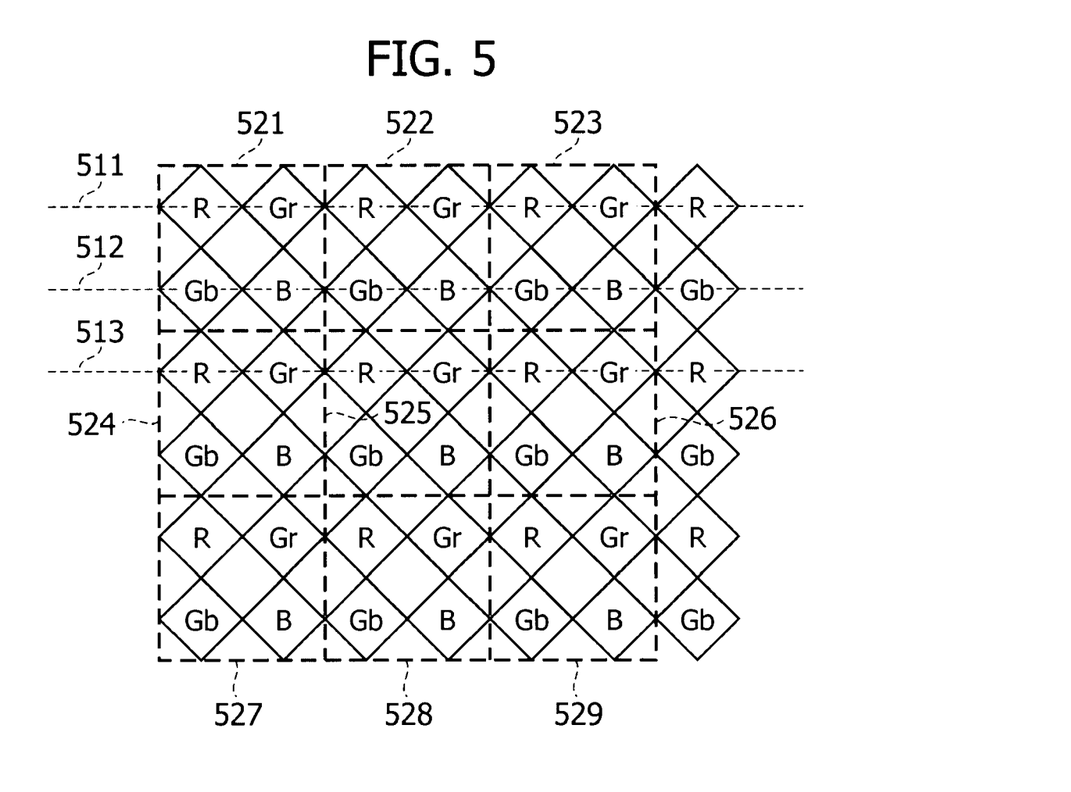
FIG. 5 is a diagram showing one example of a color filter having an oblique pixel arrangement in a case where a line including G1 and G2 pixels and a line including G3 and G4 pixels are thinned out.

The Bayer demosaic circuit 330 performs a demosaic processing to the RAW data of a Bayer format, of which the RAW data is outputted from the distributor 310, and outputs the RGB data to the selector 340. That is, the RAW data outputted from the image pickup unit 120 through the color filter having the thinned-out oblique pixel arrangement shown in FIG. 5 is subjected to the demosaic processing such as a complementing process, etc.

The selector 340 selects the RGB data outputted from the oblique pixel arrangement demosaic circuit 320 or the Bayer demosaic circuit 330 according to the control signal outputted from the mode management controller unit 160, and the outputs the selected RGB data to the γ correction processing circuit 130.

Figure 4:
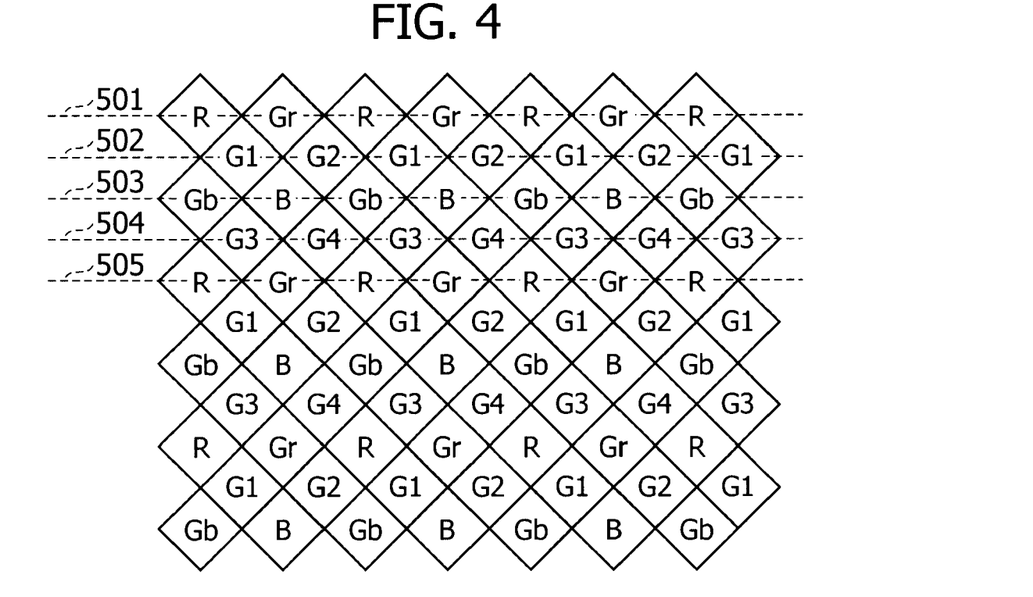
FIG. 4 is a diagram showing a pixel arrangement of a color filter having an oblique pixel arrangement, of which the color filter is attached to a light receiving unit of a photoelectric conversion unit 121.

FIG. 4 is a diagram showing a pixel arrangement of the color filter having the so-called oblique pixel arrangement, of which the color filter is attached to the light receiving unit of the photoelectric conversion unit 121. The color filter of the oblique pixel arrangement is that a ratio of G (green):R (red):B (blue) is 6:1:1 with respect to the Bayer arrangement in which the ratio of G (green):R (red):B (blue) is 2:1:1, and further, the pixel arrangement is rotated by 45 degrees. With respect to the G pixels shown in FIG. 4, the G pixel existing at a row including the R pixel is indicated as a Gr pixel; that present in a row including the B pixel is indicated as a Gb pixel; and those existing at rows between the row including the R pixel and the row including the B pixel are indicated as G1 to G4 pixels. Each number from G1 to G4 represents an identification number. FIG. 4 shows only a part of the color filter having the oblique pixel arrangement, of which the color filter is attached to the light receiving unit of the photoelectric conversion unit 121.

As shown in FIG. 4, with respect to the R pixel and the B pixel, the respective pixels adjacent thereto are not of the same color in any directions, such as upward, downward, leftward, rightward, and oblique directions. The pixel of the same color exists to be spaced apart by one pixel on the same line in the upward, downward, leftward, and rightward directions. With respect to the R pixel and the B pixel, these pixels are alternatively placed to be spaced apart by one pixel on the same line in each oblique direction. On the line in the right and left directions on which the R pixel exists, the R pixel and the Gr pixel are alternately placed. On the line in the right and left directions on which the B pixel exists, the B pixel and the Gb pixel are alternately placed. For example, on a line 501, the R pixel and the Gr pixel are alternately placed. On a line 503, the B pixel and the Gb pixel are alternately placed.

In lines between the line in the right and left directions on which the R pixel exists and that in the right and left directions on which the B pixel exists, a line on which the G1 pixel and the G2 pixel are alternately placed and that on which the G3pixel and the G4 pixel are alternately placed are placed. For example, on a line 502 between the line 501 on which the R pixel and the Gr pixel are alternately placed and the line 503 on which the B pixel and the Gb pixel are alternately placed, the G1 pixel and the G2 pixel are alternately placed. On a line 504 between the line 503 on which the B pixel and the Gb pixel are alternately placed and the line 505 on which the R pixel and the Gr pixel are alternately placed, the G3 pixel and the G4 pixel are alternately placed.

In this way, when the color filter having the oblique pixel arrangement shown in FIG. 4 is used, since the arrangement of pixels is the oblique pixel arrangement, a sampling rate in vertical and horizontal directions is "$1/\sqrt{2}$" times that of the color filter having the Bayer arrangement of the same pixel pitch. As a result, a pixel information amount two times greater may be obtained as compared to a case where the color filter having the Bayer arrangement of the same pixel pitch is used (see Patent Document 1, etc.). For example, when the image pickup element of the photoelectric conversion unit 121 is formed of N pixels, 2N of RGB signals may be generated. When a process of N pixels is performed in the image pickup device 100, the RAW data correction processing circuit 200 processes N pixels by each screen (frame) in order to process the RAW data. In the demosaic processing circuit 300, the γ correction processing circuit 130, and the color space conversion processing circuit 140, the pixel is enlarged to 2N. Accordingly, a processing capability of 2N pixels may become necessary.

In this way, when the color filter having the oblique pixel arrangement shown in FIG. 4 is used, it may achieve a resolution of two times greater as compared to the color filter of a known Bayer arrangement. In other words, when a solid-state image pickup element, having the same sensor area, for achieving a certain resolution is provided, an aperture size of each pixel of the solid-state image pickup element may be made larger as compared to the color filter having a known Bayer arrangement, and thus, it may photograph under an environment with low illumination. That is, a high sensitivity can be obtained.

When the solid-state image pickup element, having the same sensor area, for achieving a certain resolution is provided, it may suffice to read out the RAW data smaller than a case of the color filter having a known Bayer arrangement, as compared to the color filter having a known Bayer arrangement. Thus, a high-speed frame rate is enabled. That is, a high speed and a high-pixel-density moving image may be provided. For example, an HD (High Definition) moving image of a full resolution and a moving image of a large image size may be provided.

Herein, the image pickup device 100 provides a plurality of different photographing modes such as a moving image photographing, a still image photographing, a high-speed imaging, monitoring at a time of the still image photographing, or the like. However, as described above, the resolution, the frame rate, etc., required for the respective photographing modes differ. Thus, it would be desired to set the appropriate resolution, frame rate, or the like, corresponding to the photographing mode in which photographing is performed. Accordingly, in an embodiment of the present invention, as shown in FIG. 5, the pixel corresponding to the color filter having the oblique pixel arrangement shown in FIG. 4 is thinned out, and thereby, the appropriate resolution, frame rate, etc., corresponding to the photographing mode may be set.

FIG. 5 is a diagram showing one example of a pixel arrangement in the color filter having the oblique pixel arrangement shown in FIG. 4 in a case where the respective G pixels included in a line (line 502, etc.) on which the G1 pixel and the G2 pixel are alternately placed and a line (line 504, etc.) on which the G3 pixel and the G4 pixel are alternately placed are thinned out. The thinning-out process is performed by the data transferring unit 122 associated with the electrical signal outputted from the photoelectric conversion unit 121.

In an embodiment, an arrangement of a color filter in which a G line is thinned out corresponds to that of the color filter having the oblique pixel arrangement shown in FIG. 5, for example.

As shown in FIG. 5, in the color filter having the oblique pixel arrangement shown in FIG. 4, when the respective G pixels included on the line on which the G1 pixel and the G2 pixel are alternately placed and the line on which the G3 pixel and the G4 pixel are alternately placed are thinned out, there is established a pixel arrangement in which GR lines on which G (green) and R (red) are alternately arranged and GB lines on which G (green) and B (blue) are alternately arranged are arranged alternately in upward and downward directions. The ratio of G (green):R (red):B (blue) is changed from "6:1:1" to "2:1:1".

In this way, when the thinning-out process is performed, a relationship between G (green), R (red), and B (blue) becomes the same as that of the pixel arrangement of a known Bayer arrangement. That is, as shown in FIG. 5, an arrangement pattern of G (green), R (red), and B (blue) surrounded by dotted lines 521 to 529 becomes the same as a pattern of the pixel arrangement of a known Bayer arrangement. As a result, with respect to the RAW data of a Bayer format, in which the thinning-out process is performed by the data transferring unit 122, when the demosaic process similar to that which is performed to the RAW data of a known Bayer format is performed, the appropriate image process may be performed. Thus, as the Bayer demosaic circuit 330, a demosaic circuit similar to a known demosaic circuit used for the RAW data of a Bayer format may be used. In this case, an image quality as good as that of the RAW data of a Bayer format may be obtained.

In this way, when the color filter having the oblique pixel arrangement shown in FIG. 5 is used, if the image pickup element of the photoelectric conversion unit 121 is formed of N pixels, the lines including only the G pixels are thinned out and read in by the data transferring unit 122. Thus, the RAW data of N/2 is outputted from the image pickup unit 120. When the process of N pixels is performed in the image pickup device 100, to process the RAW data, the image pickup unit 120 and the RAW data correction processing circuit 200 process N/2 pixels by each screen (frame). To perform a demosaic-process on the RAW data of a Bayer format, the demosaic processing circuit 300 processes N/2 pixels by each screen (frame). In the γ correction processing circuit 130 and the color space conversion processing circuit 140, a process of N/2 pixels is performed by each screen (frame).

That is, a process content of a case where the color filter having the oblique pixel arrangement shown in FIG. 5 is used and that of a case where the color filter having the oblique pixel arrangement shown in FIG. 4 is used are compared. In this case, when the color filter having the oblique pixel arrangement shown in FIG. 5 is used, the process in the image pickup unit 120 and the RAW data correction processing circuit 200 becomes ½ (in the color filter having the oblique pixel arrangement shown in FIG. 5, "N/2" while in the color filter having the oblique pixel arrangement shown in FIG. 4, "N"). Each process in the demosaic processing circuit 300, the γ correction processing circuit 130, and the color space conversion processing circuit 140 becomes ¼ (in the color filter having the oblique pixel arrangement shown in FIG. 5, "N/2" while in the color filter having the oblique pixel arrangement shown in FIG. 4, "2N"). Thus, a high frame rate may further be achieved. When the frame rate is not changed, an electric power consumption may be reduced.

Figure 6A:
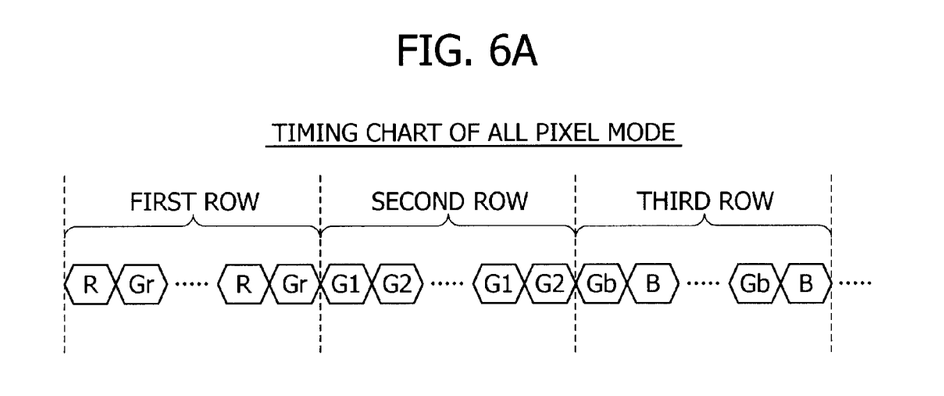
FIGS. 6A and 6B are diagrams each showing one example of a timing chart of RAW data outputted from an image pickup unit 120 in the color filter having the oblique pixel arrangement shown in FIG. 4 and the FIG. 5.
Figure 6B:
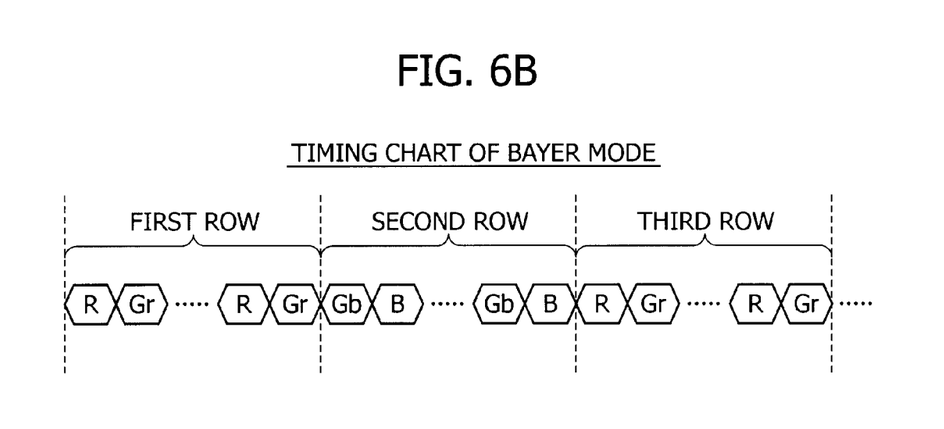

FIG. 6A is a diagram showing one example of a timing chart of the RAW data outputted from the image pickup unit 120 in the color filter having the oblique pixel arrangement shown in FIG. 4. FIG. 6B is a diagram showing one example of a timing chart of the RAW data outputted from the image pickup unit 120 in the color filter having the oblique pixel arrangement shown in FIG. 5. Each timing chart shown in FIG. 6A or 6B is schematically shown in a manner to correspond to the color filter of the pixel arrangement shown in FIG. 4 or FIG. 5.

For example, in the all-pixel mode, as shown in FIG. 6A, in the color filter having the oblique pixel arrangement shown in FIG. 4, the R pixel and the Gr pixel included on the line 501, which is a first-column line, are sequentially outputted. Subsequently, the G1 pixel and the G2 pixel included on the line 502, which is a second-column line, are sequentially outputted. Thereafter, similarly, each pixel included on each line after a third column is sequentially outputted. Thus, in the all-pixel mode, all pixels are read out. Consequently, in many cases, it may not deal with a high-speed imaging mode, or the like, requiring a high frame rate whereas it may deal with a photographing mode requiring a high resolution.

On the other hand, in the Bayer mode, as shown in FIG. 6B, in the color filter having the oblique pixel arrangement shown in FIG. 5, the R pixel and the Gr pixel included on the line 511, which is a first-column line, are sequentially outputted. Subsequently, the Gb pixel and the B pixel included on the line 512, which is a second-column line, are sequentially outputted. Thereafter, similarly, each pixel included on each line after a third column is sequentially outputted. In this way, in the Bayer mode, the pixels thinned-out by each column are read out. Thus, it may deal with the high-speed imaging mode, or the like, requiring the high frame rate whereas it may be difficult to deal with the photographing mode requiring the high resolution. Similar to a known Bayer, the demosaic process may be performed, and thus, a blurred image is not produced, thereby permitting to prevent a quality image deterioration.

FIG. 7 is a block diagram showing one configuration example of an image pickup device 600 obtained by modifying a part of the image pickup device 100 shown in FIG. 1. The image pickup device 600 includes, instead of the data transferring unit 122 in the image pickup unit 120 shown in FIG. 1, a data transfer controller unit 123. The rest of the configuration other than the image pickup unit 120 is the same as that of the image pickup device 100 shown in FIG. 1, and thus, the description of the configuration other than the image pickup unit 120 is omitted.

The image pickup unit 120 includes the photoelectric conversion unit 121 and the data transfer controller unit 123. The photoelectric conversion unit 121 is configured by a solid-state image pickup element (image sensor) such as a CCD, a CMOS, etc., performs a photoelectric conversion process to a light signal which passes through the lens 110, and outputs the photoelectrically converted electrical signal to the RAW data correction processing circuit 200. The data transfer controller unit 123 controls the electrical signal outputted by the photoelectric conversion unit 121 in accordance with the control signal outputted from the mode management controller unit 160. That is, when the data transfer controller unit 123 is inputted the control signal corresponding to the all-pixel mode, the data transfer controller unit 123 controls in such a manner that the photoelectric conversion unit 121 outputs to the RAW data correction processing circuit 200 the electrical signal, as the RAW data in an oblique pixel arrangement format, corresponding to all the pixels in the color filter having the oblique pixel arrangement shown in FIG. 4. On the other hand, when the data transfer controller unit 123 is inputted the control signal corresponding to the Bayer mode, the data transfer controller unit 123 controls in such a manner that the photoelectric conversion unit 121 outputs to the RAW data correction processing circuit 200 the electrical signal, as the RAW data of a Bayer format, corresponding to all the pixels (pixels in which each line including the G1 to G4 pixels is thinned out from the color filter having the oblique pixel arrangement shown in FIG. 4) in the color filter having the oblique pixel arrangement shown in FIG. 5.

As described above, when the oblique pixel arrangement demosaic circuit 320 capable of performing a signal process for the color filter having the oblique pixel arrangement shown in FIG. 4, and the Bayer demosaic circuit 330 capable of performing a signal process for the color filter having the Bayer arrangement are provided in the image pickup device 100, the use of the demosaic circuit may be appropriately selected with a trade-off of the resolution or the frame rate. For example, in the photographing mode requiring the high resolution, the oblique pixel arrangement demosaic circuit 320 is used to perform the signal processing. On the other hand, when the high frame rate is necessary but the resolution may be low, the Bayer demosaic circuit 330 is used to perform the signal processing. When it may not be necessary to render the frame rate high speed, the electric power consumption may be reduced.

When a pixel pitch of YCbCr outputted in the all-pixel mode is set to a reference, a pixel pitch of YCbCr outputted in the Bayer mode is to be thinned out by only one pixel. Accordingly, an influence of aliasing of the high frequency of the image, resulting from the thinning-out, may be kept to a negligible amount.

According to an embodiment of the present invention, in the all-pixel mode, a characteristic of the oblique pixel arrangement is utilized to extract the YCbCr data having the number of pixels twice as many as that of the imaging circuit. On the other hand, in the Bayer mode, relative to all the pixels corresponding to the color filter having the oblique pixel arrangement shown in FIG. 4, the data which is reduced to ¼ of the YCbCr data may be obtained. This enables a high-speed frame rate photographing. In the Bayer mode, similar to the pixel addition or the pixel thinning-out in the Bayer arrangement, it may reduce deterioration in image, resulting from the thinning-out.

In an embodiment of the present invention, a description is given of the image pickup device capable of photographing the moving and still images. It may be applied to a signal processing device (a camcorder) for a moving image photographing and a signal processing device (a digital still camera) for a still image photographing.

For example, in the case of applying to the signal processing device (the camcorder) for a moving image photographing, the all-pixel mode is set in a recording mode of the moving image photographing and the Bayer mode is set in the monitoring mode for the moving image photographing. This may enable a decrease in electric power consumption during a time when the moving image is not photographed (during the monitoring mode) and a long-time photographing without worrying about a waiting time of photographing. When the Bayer mode is set, it may provide a signal processing of a frame rate (240 frame/second, for example) higher in speed than that of a television.

In the case of applying to the signal processing device (the digital still camera) for the still image photographing, the all-pixel mode is set in the recording mode of the still image photographing and the Bayer mode is set in the monitoring mode in a case where framing is performed before the still image photographing. This may enable a decrease in electric power consumption during the framing, thereby increasing the maximum number of images to be photographed.

The arrangement in which the respective G pixels included on the line on which the G1 pixel and the G2 pixel are alternately placed and the line on which the G3 pixel and the G4 pixel are alternately placed are thinned out from the respective pixels of the color filter having the oblique pixel arrangement shown in FIG. 4 bears the same relationship to the pixel arrangement of a known Bayer arrangement, as shown in FIG. 5. Thus, when the image pickup unit 120 according to an embodiment of the present invention is used in the Bayer mode, the image processing unit of the image pickup device corresponding to a known Bayer arrangement may be used as it is.

According to embodiments of the present invention, in the image pickup element using the color filter having the oblique pixel arrangement, it can exhibit an excellent effect in which an appropriate image according to a photographing mode may be acquired.

Embodiments of the present invention illustrate example for embodying the invention, and has correspondences to specified items of the present invention in the appended claims. However, the present invention is not limited thereto and may be embodied in various modifications without departing from the spirit and scope of the present invention.

What is claimed is:

1. An imaging circuit, comprising:
   a photoelectric conversion section in which pixels each having a color filter attached thereto are arranged in an oblique direction in a lattice manner and which converts light incident through the color filter into an electrical signal by each of the pixels and outputs the electrical signal, the color filter being formed of: a GR line on which a G pixel and an R pixel are alternately arranged in a horizontal direction; a GB line on which the G pixel and a B pixel are alternately arranged in a horizontal direction; and a G line on which only the G pixel is arranged in a horizontal direction, and having a combination of: the GR line and the G line; and the GB line and the G line being placed alternately in a vertical direction to arrange the G pixel at a position adjacent to the R pixel and the B pixel; and
   a transferring section for transferring, out of electrical signals converted by the photoelectric conversion section, only an electrical signal associated with pixels included on the GR line and the GB line when in a first transfer mode.

2. The imaging circuit according to claim 1, wherein the transferring section selects one of: the first transfer mode and a second transfer mode, the second transfer mode transferring, out of the electrical signal converted by the photoelectric conversion section based on a control signal from outside, the electrical signal associated with each of the lines sequentially, and the first transfer mode transferring, out of the electrical signal converted by the photoelectric conversion section, only the electrical signal associated with the pixels included on the GR line and the GB line, to transfer the electrical signal converted by the photoelectric conversion section.

3. The imaging circuit according to claim 1, wherein the color filter in which the G line is thinned out is arranged in such a manner that a combination pattern of:
   the G pixel and the R pixel included on the GR line adjacent to a surrounding area of one G pixel included on the G line; and the G pixel and B pixel included on the GB line is arranged in a lattice manner.

4. An image pickup device, comprising:
a photoelectric conversion section in which pixels each having a color filter attached thereto are arranged in an oblique direction in a lattice manner and which converts light incident through the color filter into an electrical signal by each of the pixels and outputs the electrical signal, the color filter being formed of: a GR line on which a G pixel and an R pixel are alternately arranged in a horizontal direction; a GB line on which the G pixel and a B pixel are alternately arranged in a horizontal direction; and a G line on which only the G pixel is arranged in a horizontal direction, and having a combination of: the GR line and the G line; and the GB line and the G line being placed alternately in a vertical direction to arrange the G pixel at a position adjacent to the R pixel and the B pixel; and
a transferring section for selecting one of a first transfer mode and a second transfer mode to transfer the electrical signal converted by the photoelectric conversion section, the first transfer mode transferring, out of the electrical signal converted by the photoelectric conversion section, an electrical signal associated with each of the lines sequentially, and the second transfer mode transferring, out of the electrical signal converted by the photoelectric conversion section, only an electrical signal associated with the pixels included on the GR line and the GB line;
a first demosaic processing section for performing a first demosaic process on the electrical signal associated with each of the lines, the electrical signal being transferred in the first transfer mode; and
a second demosaic processing section for performing a second demosaic process on the electrical signal associated with the GR line and the GB line, the electrical signal being transferred in the second transfer mode.

5. The image pickup device according to claim 4, further comprising:
an operation receiving section for receiving an operation input to set at least either one of a first photographing mode or a second photographing mode; and
a controlling section which, in receipt of the operation input to set the first photographing mode, selects the first transfer mode to cause the electrical signal converted by the photoelectric conversion section to be transferred to the transferring section and to cause the first demosaic processing section to perform the first demosaic process on the transferred electrical signal, and which, in receipt of the operation input to set the second photographing mode, selects the second transfer mode to cause the electrical signal converted by the photoelectric conversion section to be transferred to the transferring section and to cause the second demosaic processing section to perform the second demosaic process on the transferred electrical signal.

6. The image pickup device according to claim 4, wherein
the color filter relating to the photoelectric conversion section is a color filter having an oblique pixel arrangement;
the first demosaic processing section performs the first demosaic processes on an electrical signal corresponding to the color filter having the oblique pixel arrangement; and
the second demosaic processing section performs the second demosaic process on an electrical signal corresponding to the color filter having a Bayer arrangement.

7. An imaging circuit, comprising:
a photoelectric conversion means for converting light incident through a color filter by each of pixels and outputting an electrical signal, the pixels each having the color filter attached thereto are arranged in an oblique direction in a lattice manner, the color filter being formed of: a GR line on which a G pixel and an R pixel are alternately arranged in a horizontal direction; a GB line on which the G pixel and a B pixel are alternately arranged in a horizontal direction; and a G line on which only the G pixel is arranged in a horizontal direction, and having a combination of: the GR line and the G line; and the GB line and the G line being placed alternately in a vertical direction to arrange the G pixel at a position adjacent to the R pixel and the B pixel; and
means for transferring, out of electrical signals converted by the photoelectric conversion section, only an electrical signal associated with pixels included on the GR line and the GB line when in a first transfer mode.

8. An image pickup device, comprising:
a photoelectric conversion means for converting light incident through a color filter into an electrical signal by each of pixels and outputting the electrical signal, the pixels each having the color filter attached thereto are arranged in an oblique direction in a lattice manner, the color filter being formed of: a GR line on which a G pixel and an R pixel are alternately arranged in a horizontal direction; a GB line on which the G pixel and a B pixel are alternately arranged in a horizontal direction; and a G line on which only the G pixel is arranged in a horizontal direction, and having a combination of: the GR line and the G line; and the GB line and the G line being placed alternately in a vertical direction to arrange the G pixel at a position adjacent to the R pixel and the B pixel; and
means for selecting one of a first transfer mode and a second transfer mode, the first transfer mode transferring an electrical signal associated with each of the lines sequentially, out of the electrical signal converted by the photoelectric conversion section, and the second transfer mode transferring only an electrical signal associated with the pixels included on the GR line and the GB line, and transferring the electrical signal converted by the photoelectric conversion section, out of the electrical signal converted by the photoelectric conversion section;
a first demosaic processing section for performing a first demosaic process on the electrical signal associated with each of the lines, the electrical signal being transferred in the first transfer mode; and
a second demosaic processing section for performing a second demosaic process on the electrical signal associated with the GR line and the GB line, the electrical signal being transferred in the second transfer mode.

9. The imaging circuit according to claim 7, wherein the means for transferring selects one of: the first transfer mode and the second transfer mode, the second transfer mode transferring, out of the electrical signal converted by the photoelectric conversion section based on a control signal from outside, the electrical signal associated with each of the lines sequentially, and the first transfer mode transferring, out of the electrical signal converted by the photoelectric conversion section, only the electrical signal associated with the pixels included on the GR line and the GB line, to transfer the electrical signal converted by the photoelectric conversion section.

* * * * *